Feb. 18, 1964   J. W. ROSENKRANDS ETAL   3,121,561
SUSPENSION CONTROL ARM AND SPRING ASSEMBLY
Filed June 20, 1962   2 Sheets-Sheet 2

INVENTORS
John W. Rosenkrands,
Harold L. Beck &
Harold E. Boettger
BY
W. F. Wagner
ATTORNEY

United States Patent Office 3,121,561
Patented Feb. 18, 1964

3,121,561
SUSPENSION CONTROL ARM AND SPRING ASSEMBLY
John W. Rosenkrands, Detroit, Harold L. Beck, Marine City, and Harold E. Boettger, Pontiac, Mich., assignors to General Motors Corporation, Detroit, Mich., a corporation of Delaware
Filed June 20, 1962, Ser. No. 203,960
5 Claims. (Cl. 267—57)

This invention relates to vehicle suspension and more particularly to an improved control arm and spring assembly therefor.

An object of the present invention is to provide an improved vehicle suspension.

Another object is to provide an improved suspension control arm and spring assembly.

A further object is to provide a suspension control arm and spring assembly wherein the latter is in the form of a longitudinally extending torsion spring, which spring is disposed entirely within the longitudinal extremities of the control arm.

Still a further object is to provide a control arm and spring assembly wherein the control arm is fabricated in the form of a wishbone, the apex of which is pivotally connected to a wheel supporting member, the inboard ends of the wishbone being longitudinally spaced and the space therebetween being bridged by a laminated leaf torsion spring.

Still another object is to provide an assembly of the type described wherein the inboard ends of the wishbone arm are pivotally secured to a vehicle superstructure by means of rubber bushed pivot shafts which are axially aligned with the longitudinal centerline of the torsion spring.

Yet a further object is to provide an arrangement of the stated character wherein the pivot members are detachably mounted relative to the control arm and superstructure in such a way as to permit ease of installation and removal of the torsion spring.

These and other objects, advantages and features of the invention will become more fully apparent as reference is had to the accompanying specification and drawings wherein.

Figure 1:
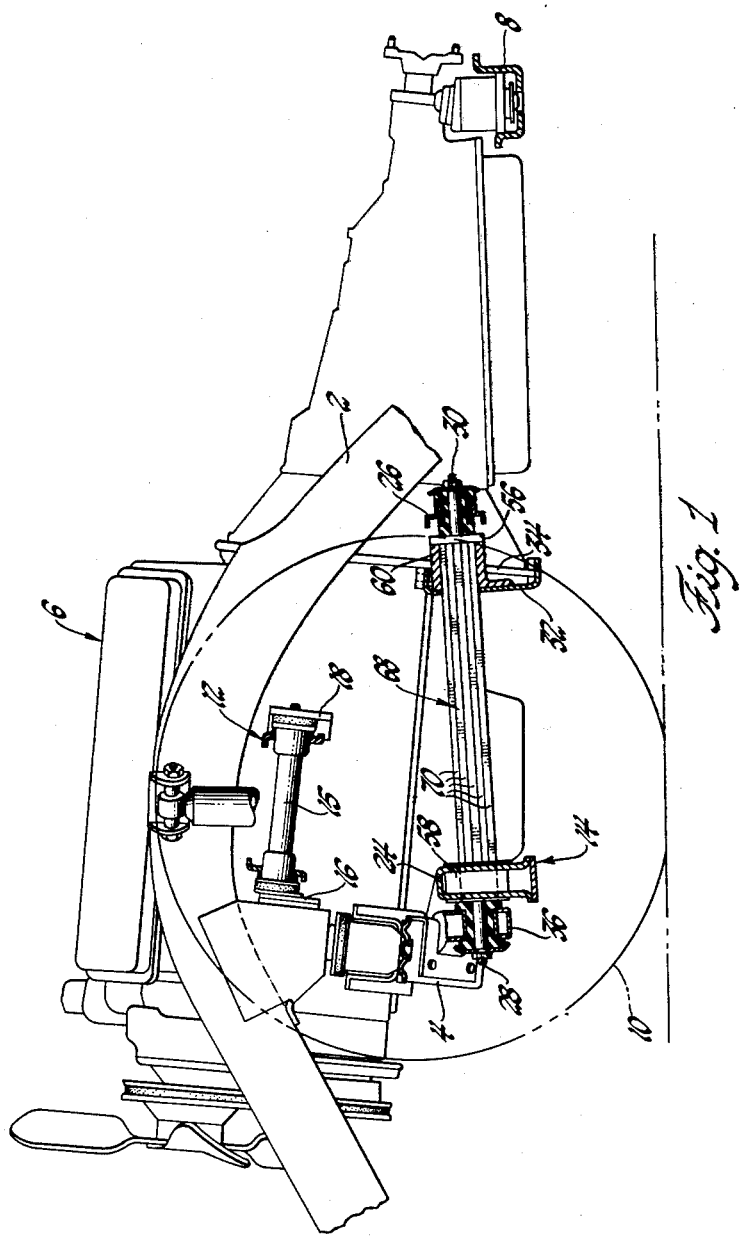
FIGURE 1 is a side elevational view, partly in section, of the front portion of a vehicle chassis illustrating a lower suspension control arm and spring assembly in accordance with the invention.
Figure 2:
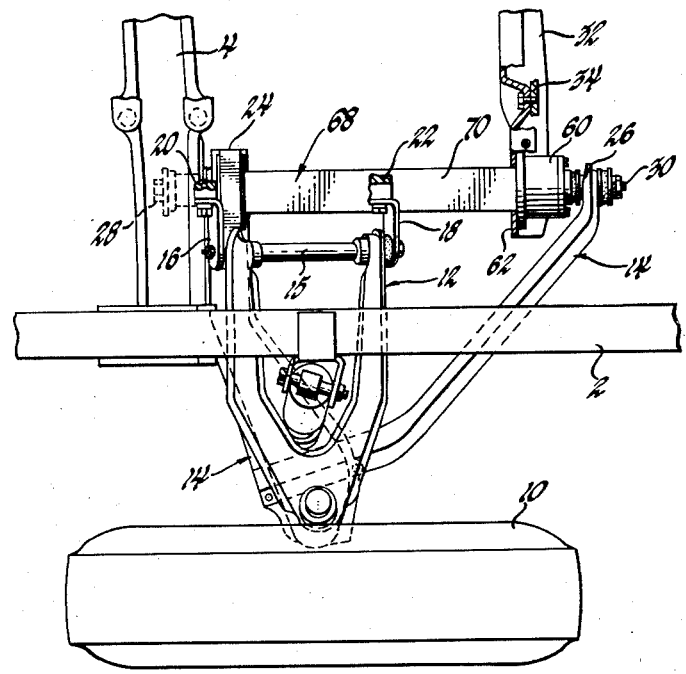
FIGURE 2 is a fragmentary top plan view, partly in section, of the assembly shown in FIGURE 1.

Referring now to the drawings and particularly FIGURE 1, there is shown a vehicle chassis in which the reference numeral 2 designates one of two laterally spaced longitudinally extending frame side rails. Extending transversely of and resiliently connected at its opposite ends to side frame members 2 is a first cross frame member 4, to which the forward end of an engine unit 6 is rigidly mounted. The rearward end of engine 6 in turn is elastically mounted on a second cross frame member 8. As seen best in FIGURES 1 and 2, the frame and engine unit are suspended relative to dirigible wheel 10 by means of an upper control arm assembly 12 and a lower control arm assembly 14 which extend laterally and in vertically spaced relation outwardly from the engine unit and beneath side rail 2. The laterally spaced inboard ends of upper control arm 12 are pivotally mounted on a generally longitudinally extending shaft 15 which in turn is secured by brackets 16 and 18 to bosses 20 and 22 formed integrally on engine unit 6. The longitudinally spaced inboard ends 24 and 26 of control arm 14 in turn are pivotally mounted on engine unit 6 by a pair of axially aligned longitudinally spaced rubber bushed pivot shafts 28 and 30 which are secured, in a manner shortly to be described, respectively to the inboard end 24 and to a transverse bracket 32 disposed beneath engine unit 6 midway between its front and rear extremity. Bracket 32 in turn is secured to a flange 34 integral with engine unit 6.

Figure 3:
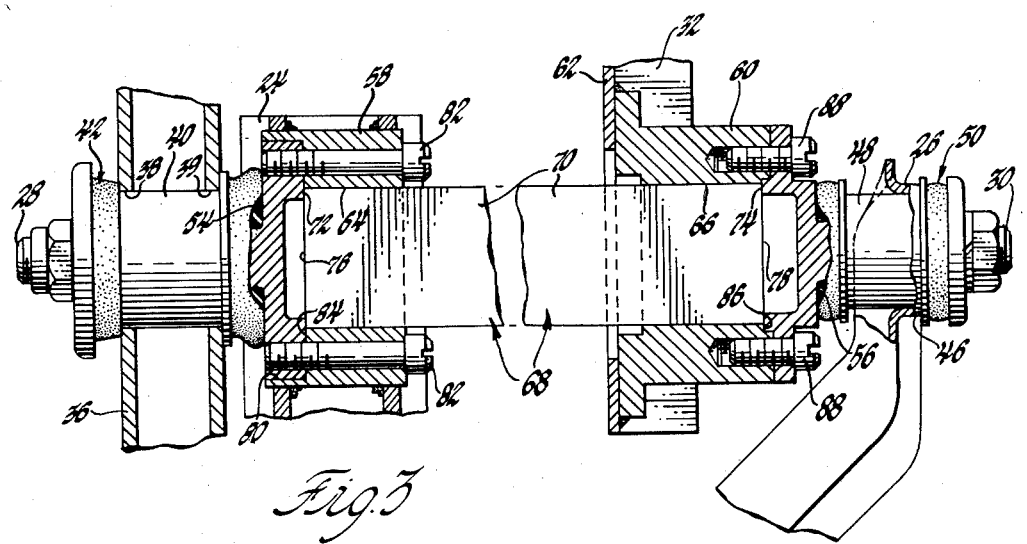
FIGURE 3 is a greatly enlarged and partially sectioned view of a portion of the construction shown in FIGURE 2, the torsion spring being broken away intermediate the length thereof and collapsed longitudinally.

As seen best in FIGURES 1 and 3, cross frame member 4 is provided with a depending box-like bracket 36 having longitudinally aligned apertures 38 and 39 formed in the walls thereof. Apertures 38 and 39 receive the outer cylindrical shell 40 of a rubber bushing assembly 42 which supports a forward pivot shaft member 28. The rearward end 26 of control arm 14 is formed with an eye 46 in which is received the outer cylindrical shell 48 of a second rubber bushing assembly 50. Assembly 50 surrounds and is rotatably supported on rearward pivot shaft member 30.

In accordance with the present invention, forward and rearward pivot shaft members 28 and 30 are provided with opposed flanges 54 and 56 which are detachably secured respectively to a forward cylindrical block member 58 and a rearward cylindrical anchor member 60. Block member 58 is secured, as by welding, within the channel section forward inboard end 24 of arm 14, while anchor member 60 is secured, as by welding, to the vertical face 62 of bracket 32. Block member 58 and anchor member 60 are provided with longitudinally aligned square sockets 64 and 66 which are dimensioned to slidably receive a "package" torsion spring 68 formed of laminated leaf springs 70. In order to axially position torsion spring 68 longitudinally of block 58 and anchor 60, both are formed for threadable connection with pivot shaft assemblies 28 and 30 so that when the latter are in assembled relation, the opposed faces 72 and 74 thereof form abutment shoulders which engage the opposite ends 76 and 78 of spring 68.

As seen best in FIGURE 3, the forward end of block 58 is formed with a recess or socket 80 which is adapted to receive the flange portion 54 of pivot shaft assembly 42. Upon tightening of bolts 82, flange 54 is drawn into abutting engagement with the bottom wall 84 of recess 80 which establishes the abutment location of shoulder 72. The rearward face of anchor block 60 in turn is formed with a pilot recess 86 which receives the flange portion 74 of pivot shaft assembly 50. Upon tightening of bolts 88, flange 56 is drawn into abutting engagement with the rear face of anchor 60 and establishes the location of abutment shoulder 74.

When constructed in accordance with the present invention, the control arm of the spring assembly enables extreme ease of installation and disassembly. By way of illustration, to remove the spring 68 from the installed position, it is only necessary to detach bolts 82 from flange 54 and detach bracket 32 from engine unit 6. The entire control arm 14, spring 68 and bracket 32 may then be moved bodily rearwardly until flange 54 clears socket 80. Thereafter, the entire inboard end of the control arm and spring 68 may be lowered below the level of flange 54. The spring package 68 is then free to move longitudinally forwardly through the square sockets 64 and 66 until completely removed.

In addition to the extreme simplicity of installation and removal, a construction according to the present invention retains all of the advantages of wishbone type control arms having rubber bushed pivots, while allowing utilization of a torsion spring as the elastic medium.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:
1. A suspension and spring assembly comprising, a generally V-shaped control arm having longitudinally spaced apart inboard ends, a longitudinally extending torsion spring confined entirely within the space between said inboard ends, means forming a socket in one of said inboard ends engaging one end of said spring, an anchor member disposed axially adjacent the other inboard end of said control arm, means forming a socket in said anchor member engaging the other end of said spring to resist torsional movement thereof, a first pivot shaft member connected to said one inboard end of said control arm in axial alignment with the torsional axis of said spring, and a second pivot shaft member connected to said anchor member and projecting through the other inboard end of said control arm in axial alignment with said first pivot shaft, said torsion spring being axially movable completely through each of said sockets, and said pivot shaft members including portions which abut the adjacent ends of said spring to retain the latter in a predetermined installed position axially of said arm.

2. The structure set forth in claim 1 wherein said sockets are generally square and said torsion spring comprises a plurality of leaf springs forming a generally square cross section.

3. In combination with a vehicle superstructure, a wheel suspension assembly comprising, a horizontally disposed transversely extending generally V-shaped wheel control arm having longitudinally spaced inboard ends, one of said inboard ends including a block member having a longitudinally directed polygonal socket extending therethrough, a longitudinally extending torsion spring disposed entirely between said inboard ends with one extremity thereof engaging said socket, an anchor member secured to said superstructure axially adjacent the other of said inboard ends, said anchor member having a longitudinally extending polygonal socket extending therethrough in which the other extremity of said spring is received, longitudinally spaced first and second pivot members disposed in axial alignment with the major axis of said spring, each pivot member including a flange secured in abutting engagement with said block member and said anchor member respectively, a resilient bearing mounted on said superstructure surrounding said first pivot shaft, and a resilient bearing mounted on the other inboard end of said arm surrounding said second pivot shaft.

4. The structure set forth in claim 3 wherein said anchor block is located between said inboard ends of said arm.

5. In combination with a vehicle superstructure, a wheel suspension assembly comprising, a horizontally disposed transversely extending generally V-shaped wheel control arm having longitudinally spaced inboard ends, the forward inboard end including a block member having a longitudinally directed polygonal socket extending therethrough, a longitudinally extending laminated leaf torsion spring disposed entirely between said inboard ends with one extremity thereof engaging said socket, an anchor member secured to said superstructure axially forwardly adjacent the rearward inboard end, said anchor member having a longitudinally extending polygonal socket extending therethrough in which the other extremity of said spring is received, a first pivot member mounted on the forward end of said arm and projecting forwardly therefrom, a second pivot member mounted on said anchor member and projecting rearwardly therefrom, said pivot members defining a projected axis containing the major axis of said spring, and means forming a flange on each pivot member secured in abutting engagement with said block member and said anchor member respectively, said flanges including stop means limiting axial movement of said spring relative to said arm, a bearing mounted on said superstructure resiliently supporting said first pivot shaft, and a bearing mounted on the rearward inboard end of said arm resiliently supporting the latter on said second pivot shaft.

References Cited in the file of this patent
UNITED STATES PATENTS
2,925,264     Loehr _____ Feb. 16, 1960
FOREIGN PATENTS
1,087,011     Germany _____ Aug. 11, 1960